Patented Jan. 28, 1936

2,029,204

UNITED STATES PATENT OFFICE 2,029,204

TRANSFER INK

Frank Solomon, New York, N. Y., assignor to Beatrice Brier, Long Beach, N. Y.

No Drawing. Application May 28, 1934,
Serial No. 727,912

2 Claims. (Cl. 134—28)

This invention relates to a new improved transfer marking ink.

One of the objects of my invention is to provide a new transfer marking ink which is applied by printing or marking on to a paper base, the said ink being released from its paper base under heat and pressure, and transferring the printing or marking on to a desired piece of material.

Another object of the invention is to provide a new transfer marking ink, which will be solid at normal atmosphere but which will flow in the presence of a low temperature from a hot iron.

The transfer marking ink compositions hitherto used have either been appliable under a low degree of heat, or under a high degree of heat, but could not be properly applied under both conditions with the same transfer marking ink.

The result has been that great care had to be exercised, and a resultant loss of time and damaged goods ensued, constant attention had to be given to the degree of heat used in its application. Under this invention the necessity for this care is eliminated.

The transfer marking inks in use hitherto that required a low degree of heat would if the iron became too hot be illegible, blurred, and sometimes be entirely obliterated. Material would be damaged, and time would be wastefully consumed waiting for the iron or heating unit to cool off before this work could properly continue.

The transfer marking inks in use hitherto that required a high degree of heat would not release from its paper base until the iron or heating unit attained this high degree of heat, and here again a loss of time occurred.

There has been a large demand for a composition of the type embodied in this invention, which would clearly transfer under both degrees of heat, and would eliminate the necessity of the careful watching and regulating of the heating unit used in its application.

The composition which I have found meets the aforementioned requirements is made up as follows:—

Five (5) parts of orange (bone dry) shellac in flake or powder form, mixed in one (1) part of titanium dioxide powder, stirred and kept at a boiling point until a gelatinous mass is formed, then one half (½) part of tricresyl phosphate is added and stirred, then five (5) parts of rosin are added and one half (½) part of a heavy grade varnish, preferably the grade used in lithograph printing is added. The desired coloring matter is then added in bronze powders, dye or pigment form, and stirred always at a boiling point until thoroughly intermixed with the other ingredients. When thoroughly mixed, the mixture is then removed from the heat and permitted to solidify until it is ready for use.

This illustrates one of the embodiments of my invention. It is of course understood that I do not wish to be limited to the method exemplified, or to a product produced only by this mentioned procedure.

This solid composition can be melted and printed in a molten condition to form markings on a paper base.

The markings on the paper base can then be transferred by placing the paper face down on the material to be marked, and then applying a hot iron upon the back of the paper base.

This composition can be used for marking leather, rubber, silks, cotton fabrics, or upon any article where a marking of this nature is desired.

This formula can be modified to conform to climatic conditions.

The titanium dioxide is used as a base which acts as a resistant when a high degree of heat is applied, and keeps the transferred mark legible on the surface of the material to which it has been applied. It acts to opaquify the color composition.

The tricresyl phosphate liquid is particularly soluble in rosins and acts as a blending agent for the chemicals in this formula, forming a flexible stable adhesive film with them.

The varnish acts in adding a lustre to the ink, and also acts to make the transfer more adhesive.

The shellac and rosin give advantageous printing or marking qualities to the aforementioned ingredients. Gums and waxes however can be used to replace or substitute the shellac and rosin.

The improved transfer marking ink is a solid at normal atmospheric temperature, but will flow when exposed to a low temperature from a hot iron, so that it can be worked at lower temperatures than is required for other inks.

I claim:

1. A transfer ink having a solid state in normal atmospheric temperature and flowable into a thin film in the presence of low heat from a hot iron, consisting of five parts of shellac combined with approximately one part of titanium dioxide in the presence of heat with one-half a part of tricresyl phosphate, five parts of rosin and a one-half part of varnish sufficient to form a binder for the other ingredients, together with coloring material added thereto.

2. A transfer ink flowable in the presence of heat at moderately low temperature from a hot iron from a normally solid state, consisting of approximately five parts of shellac, one part of titanium dioxide, five parts of rosin, one-half a part of tricresyl phosphate and one-half a part of heavy lithographic varnish combined and mixed in the presence of heat.

FRANK SOLOMON.